July 13, 1926.  1,592,417
W. W. BURKE
WINDMILL
Filed June 23, 1925     2 Sheets-Sheet 1
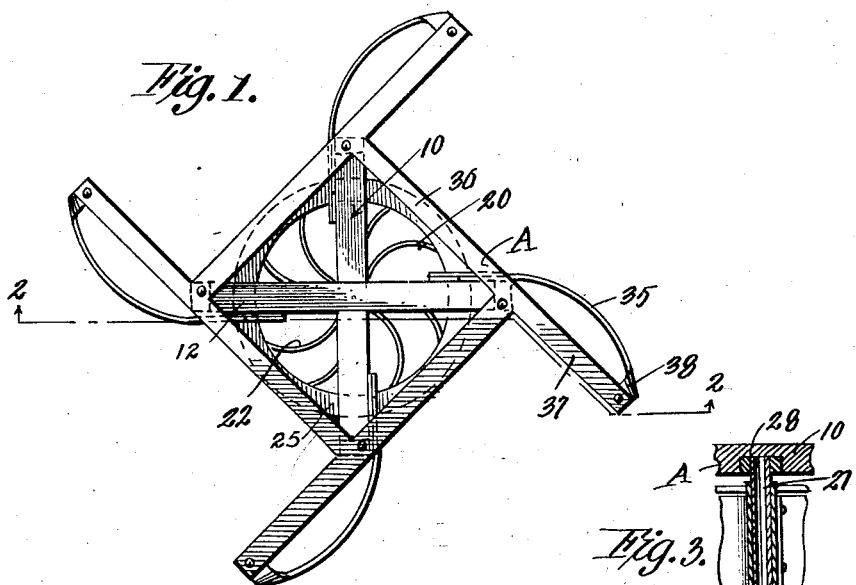
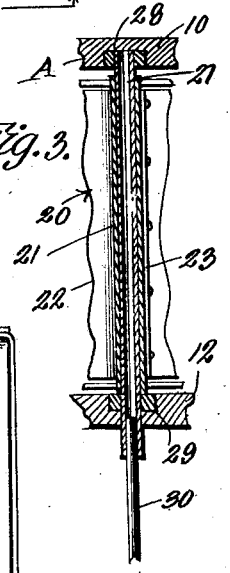
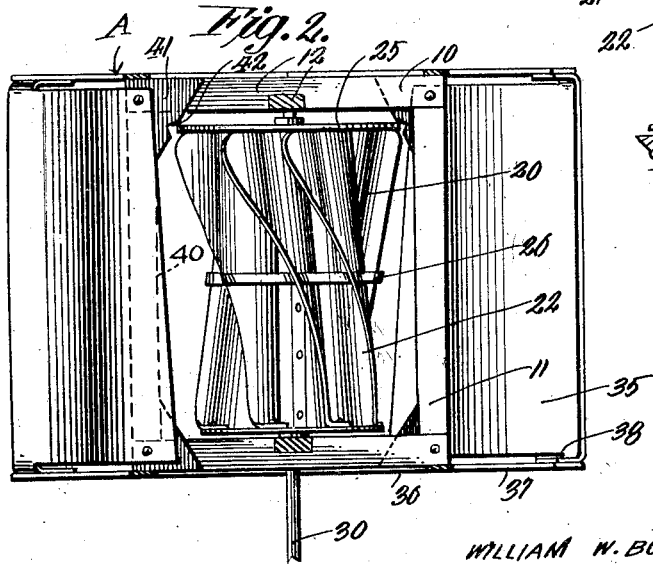
WITNESSES
Inventor
WILLIAM W. BURKE
By Richard B. Owen
Attorney

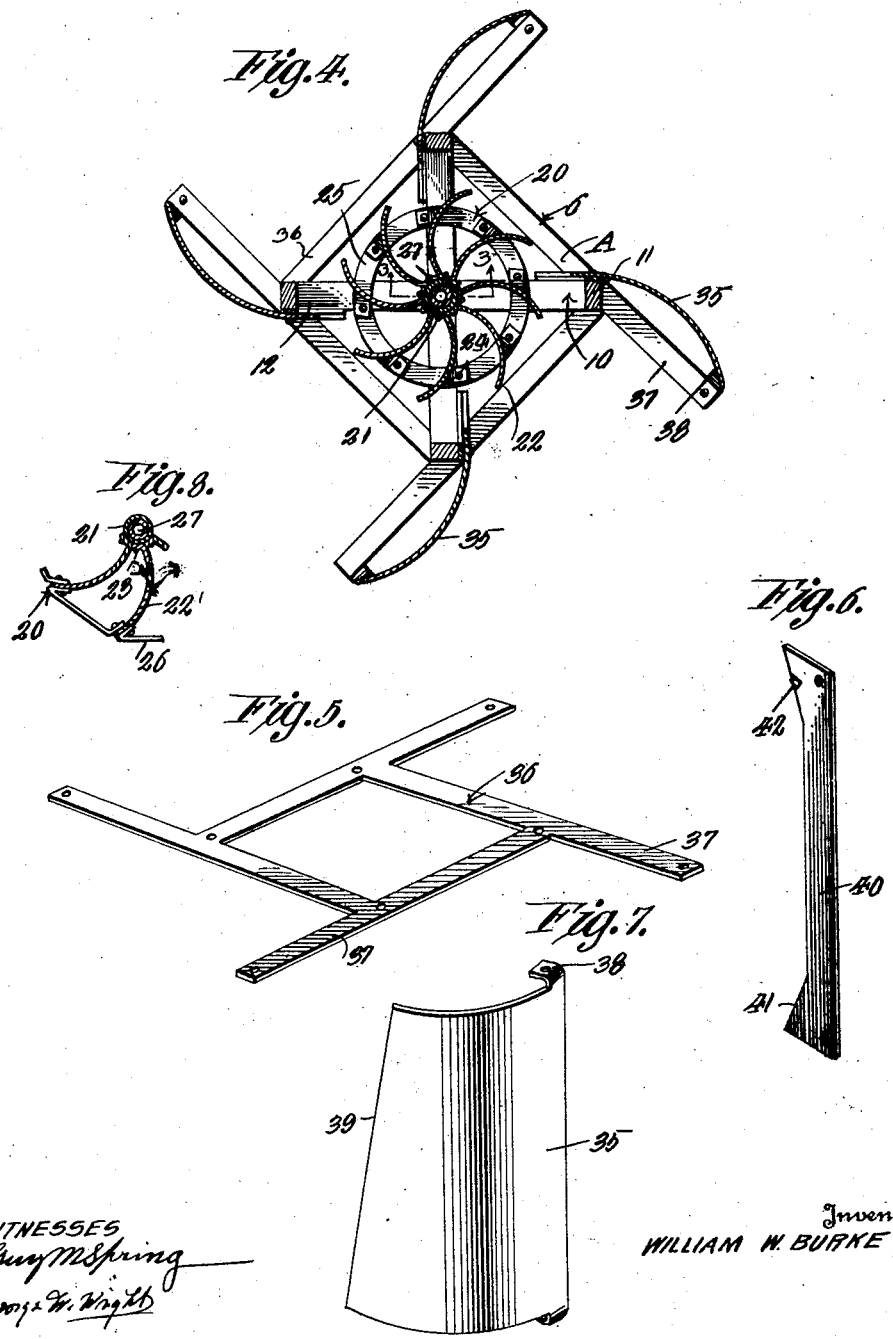

Patented July 13, 1926.

1,592,417

UNITED STATES PATENT OFFICE.

WILLIAM W. BURKE, OF LINDEN, TEXAS.

WINDMILL.

Application filed June 23, 1925. Serial No. 39,109.

This invention appertains to wind wheels and one of the primary objects of the invention is to provide a novel wind-wheel and and novel means for directing the full force of the wind, irrespective of the direction in which the same is blowing, against the panels or blades of the wheel.

Another object of the invention is to provide a wind mill embodying a novel wind wheel rotatably mounted within a suitable frame, the frame including tangentially extending pairs of upper and lower arms, the pairs of arms supporting novel arcuate wings for directing the wind against the blades of the wheel.

A further object of the invention is the provision of a novel wind wheel gradually tapered in diameter toward its lower end and including a plurality of spaced arcuate blades twisted spirally around the hub thereof, the blades being braced in a novel manner to prevent the distortion thereof. A further object of the invention is to provide an improved wind wheel which will be durable and efficient in use, one that will be simple and easy to manufacture, and one which can be placed upon the market at a small cost and used for a number of different purposes.

With these and other objects in view, the invention consists in the novel construction, arrangement and formation of parts, as will be hereinafter more specifically described, claimed and illustrated in the accompanying drawings, in which drawings:

Figure 1 is a plan view of the improved windmill,

Figure 2 is a vertical section through the same taken on the line 2—2 of Figure 1 looking in the direction of the arrows, Figure 3 is a detail section taken on the line 3—3 of Figure 4 showing the construction of the hub of the wind wheel and the means for mounting the wind wheel in position on its supporting frame, Figure 4 is a horizontal section through the windmill, Figure 5 is a detail perspective view of the novel means employed for bracing the frame and supporting the guide wings, Figure 6 is a perspective view of one of the bracing strips for the wings, Figure 7 is a perspective view of one of the guide wings, Figure 8 is a fragmentary detail horizontal section through the wind wheel illustrating the means of connecting the blades with the hub of the wheel and the means for bracing the blades.

Referring to the drawings in detail, wherein similar reference characters designate corresponding parts throughout the several views, the letter A generally indicates the improved windmill, which comprises a frame 10, in which is rotatably mounted the wind wheel 20. The frame 10 embodies upright corner supporting standards 11, which are bolted or otherwise secured to radially extending arms 12. These arms 12 cross each other at right angles and can be connected together in any preferred way.

The wind wheel 20 embodies a hollow hub 21 to which is secured the equi-distantly spaced arcuate blades 22. The inner edges of the blades are provided with attaching flanges 23 which permit the blades to be readily riveted or otherwise secured to the hub. The blades gradually decrease in width toward their lower ends, which forms a substantially frusto-conical shaped wheel and the blades are twisted spirally about the hub. The frusto-conical shape of the wind wheel tends to catch the wind in such a manner as to cause a lifting action thereon, thus relieving friction to a great extent on the lower bearing.

In order to brace the blades the opposite ends thereof are provided with attaching lugs 24 which are riveted or otherwise secured to upper and lower annular retaining rings 25. If desired the blades 22 can be braced at a point intermediate their ends by suitable bracing strips 26 which can be riveted or otherwise secured to the blades adjacent to the outer edges thereof. The hollow hub 21 can be secured to a hollow shaft 27 the terminals of which can be extended beyond the hub. The extended terminals of the shaft are adapted to be mounted in suitable bearings 28 and 29 carried by the frame 10 at the point of crossing of the arms 12. These bearings can be in the nature of ball or roller bearings, if desired, and the bearing 29 can be of the thrust type. A spindle 30 can be secured to the hollow shaft 27 and is extended below the frame 10 and any desired device can be fixed to said spindle to permit power to be taken off of the same.

In order to direct the wind to the wind wheel irrespective of the direction in which the wind is blowing, novel arcuate wings 35 are provided. These wings 35 can be constructed from sheet metal and are held in place by upper and lower frames 36. These frames 36 include arms 37 which extend substantially tangentially to the periphery of the wind wheel. The upper and lower ends of the wings 35 at the outer ends thereof are provided with right angularly extending attaching ears 38 which are secured to the outer ends of the arms 37. The wings 35, as stated are arcuate shaped in horizontal section and extend inwardly toward the wind wheels and have their inner edges preferably secured to the uprights or standards 11. The inner edges of the wings 35 are cut diagonally as at 39 so as to conform to the configuration of the wind wheel.

In order to effectively brace the wings and the frame 10, upright bracing strips 40 are provided. These bracing strips 40 are secured respectively to the uprights 11 and the inner faces of the wings 35 and the opposite ends of the bracing strips 40 are extended as at 41 for engaging the upper and lower ends of the wings at the inner edge thereof. If necessary the upper enlarged ends 41 of the bracing strips 40 can be notched as at 42 for the upper bracing rings 25 of the wind wheel.

From the foregoing description, it can be seen that I have provided an exceptionally simple device, which will effectively accomplish the purpose intended.

Changes in details, may be made without departing from the spirit or the scope of this invention, but:

What I claim as new is:

1. In a windmill, a frame, a wind wheel revoluble in the frame on a vertical axis, supporting arms extending from the frame substantially at a tangent to the periphery of the wind wheel, and arcuate wings carried by the arms for directing the wind toward the wheel.

2. In a windmill, a frame, a wind wheel revoluble on a vertical axis mounted within the frame including a hub, equidistantly spaced arcuate blades carried by the hub and extending spirally around the same, the blades gradually decreasing in width toward one end thereof, upper and lower bracing rings secured respectively to the terminals of the blades, and braces connected to the intermediate portions of the blades.

3. In a windmill, a supporting frame, a wind wheel disposed vertically within the frame including a hub, equidistantly spaced arcuate blades secured to the hub, the blades gradually decreasing in width toward one end of the wheel and arranged spirally about the hub, upper and lower arms carried by the frame and extending substantially at a tangent to the periphery of the wheel, and arcuate wings carried by and between said arms arranged at quarters on the frame for directing the wind toward the wind wheel.

4. In a windmill, a frame, a wind wheel revoluble on a vertical axis mounted in the frame including a hollow hub, equi-distantly spaced arcuate blades carried by the hub and extending spirally around the same, the blades gradually decreasing in width toward one end thereof, upper and lower bracing rings secured respectively to the terminals of the blades, braces connected to the intermediate portion of the blades, and polygonal shaped brackets secured to the upper and lower ends of the frame including outwardly extending arms arranged substantially in a tangent to the periphery of the wind wheel, and guide wings connected to the arms and the frame, the inner edges of the wings being cut at an angle to conform to the configuration of the wind wheel, and means for bracing said wings.

In testimony whereof I affix my signature.

WILLIAM W. BURKE.